United States Patent [19]
Komatsu et al.

[11] Patent Number: 5,335,498
[45] Date of Patent: Aug. 9, 1994

[54] CONTRACTION-EXTENSION MECHANISM TYPE ACTUATOR

[75] Inventors: Kiyoshi Komatsu; Takehisa Mori; Masao Takinami, all of Kanagawa, Japan

[73] Assignee: Terumo Kabushiki Kaisha, Tokyo, Japan

[21] Appl. No.: 10,788

[22] Filed: Jan. 29, 1993

[30] Foreign Application Priority Data

Jan. 30, 1992 [JP] Japan .................. 4-015165

[51] Int. Cl.⁵ .................................................. F03G 7/06
[52] U.S. Cl. .................................... 60/528; 60/527
[58] Field of Search ................ 60/527, 528, 529; 337/393, 396

[56] References Cited

U.S. PATENT DOCUMENTS

| | | | |
|---|---|---|---|
| 4,553,393 | 11/1985 | Ruoff | 60/528 |
| 4,790,624 | 12/1988 | Van Hoye et al. | |
| 4,864,824 | 9/1989 | Gabriel et al. | 60/528 |
| 5,035,530 | 7/1991 | Fukuda et al. | 60/527 |
| 5,061,914 | 10/1991 | Busch et al. | 60/527 |

FOREIGN PATENT DOCUMENTS

| | | |
|---|---|---|
| 61-53467 | 3/1986 | Japan . |
| 2106190 | 4/1983 | United Kingdom . |
| WO89/10241 | 11/1989 | World Int. Prop. O. . |

Primary Examiner—Ira S. Lazarus
Assistant Examiner—L. Heyman
Attorney, Agent, or Firm—Burns, Doane, Swecker & Mathis

[57] ABSTRACT

A contraction-extension mechanism type actuator is provided which operates with a small and simple mechanism, offers no hindrance to other work units, adopts a construction capable of fine adjustment, and enables only the leading end of a module to be freely moved while producing virtually no motion of the module itself. These objects are accomplished by a contraction-extension mechanism type actuator which is a joint array formed of a shape-memorizing alloy and provided with a contraction-extension mechanism having shape-controlling heaters integrally attached to the component joints of the array and having the joint array itself serving as its own drive source.

6 Claims, 6 Drawing Sheets

CONTRACTION-EXTENSION MECHANISM TYPE ACTUATOR

BACKGROUND OF THE INVENTION

1. Field of the Invention

This invention relates to a contraction-extension mechanism type actuator. More particularly, it relates to a contraction-extension mechanism type actuator provided with a small simply constructed drive mechanism and adapted to serve as a work module for a micromachine.

2. Description of the Prior Art

For the work of micromodules, the mechanism which discerns the environmental condition of an object under treatment and feeds it back to a control system is indispensable. A micromachine which is intended to perform work within a minute pipe measuring not more than 10 mm in diameter, for example, is required to move a visual sensor or a tactile sensor or a work module which is disposed on a module at the leading end such as of a tubular manipulator. Though no large forces are needed in driving the leading end of such a work module, the mechanism used for this driving is preferably small and simple and so constructed as to admit fine adjustment since the leading end of the work module additionally accommodates a mechanism for the work. This mechanism preferably imparts virtually no motion to the module itself and enables only the sensors disposed at the leading end of the module to be freely moved with a stroke approximately in the range of from 1 to 500 $\mu$m, for example.

Among the conventional actuators furnished with a small and simple mechanism and so constructed as to admit fine adjustment is the piezzo-actuator which is used in a scanning type tunnel microscope (STM) as illustrated in FIG. 11.

This piezzo-actuator is provided with piezzo elements 151, 152 and 153 in the X, Y, and Z directions respectively so as to move a probe 154 in a selected direction by applying a voltage to the piezzo element assigned to the selected direction. At this time, the size of a motion of a sample 156 on a sample base 155 is controlled by suitably varying the voltage being so applied. The piezzo elements 151, 152, and 153 which are used herein are adapted to produce an adjustable voluminal change by the application of a voltage. This adjustable change is substantially proportional to the magnitude of the voltage applied. The piezzo-actuator as a whole can be fabricated in a size fit for accommodation within a micromachine.

Since the size of a stroke which can be generated by a piezzo-actuator of this type is about 1 $\mu$m at most, it is incapable of freely moving such sensors as are disposed at the leading end of the module of the micromachine and cannot be adapted for this purpose.

An object of this invention, therefore, is to provide a contraction-extension type actuator which operates with a small and simple mechanism, offers no hindrance to other work units, adopts a construction capable of fine adjustment, imparts virtually no motion to the module itself, and enables only the leading end of the module to be freely moved with a stroke approximately in the range of from 1 to 500 $\mu$m, for example.

SUMMARY OF THE INVENTION

The object described above is accomplished by a contraction-extension mechanism type actuator comprised of an array of joints provided with a contraction-extension mechanism and using the array of joints itself as a drive source.

This invention relates further to a contraction-extension mechanism type actuator characterized by having the array of joints formed of a shape-memorizing alloy and having several component joints of the array provided integrally with shape-controlling heaters. The contraction-extension mechanism type actuator of this invention which comprises an array of expansion joints and uses the array of joints itself as a drive source for the actuator is simple and permits a reduction in size. This actuator, when attached to a micromachine, offers no hindrance to other work units and it enables various sensors attached to the leading end thereof to be freely moved.

DESCRIPTION OF THE PREFERRED EMBODIMENT

Figure 1A:
FIG. 1 is a process diagram intended to aid in describing a process for the fabrication of an array of joints contemplated by this invention.

The contraction-extension mechanism type actuator of this invention comprises an array of joints having of a freely expandable contraction-extension mechanism. The array of joints is obtained by molding a material capable of changing its own shape such as, for example, a shape-memorizing alloy in the form of a multiplicity of joints arranged like a bellows or coil and consequently able to expand and contract and having shape-controlling heaters integrally attached to each of the component joints of the bellows or coil. The array of joints, when necessary, may be provided with a supporting member or enclosed by a material such as a polymer capable of changing its own shape by following the movement of the array of joints, and further provided at one leading end thereof with various sensors and fastened at the other leading end thereof to a micromachine proper so as to function as an actuator.

Owing to the construction described above, the array of joints has no need for any external power source but constitutes itself as a drive source. This array of joints can be freely moved by suitably varying the temperatures of the several component heaters assigned to the component joints. Thus, the actuator possesses a simple construction and allows accurate control of its own operation. Further, since this actuator can be fabricated in a size of the order of 0.1 to 10 mm, it can be attached to a micromachine so as to be operated with high efficiency without offering any hindrance to the other work units of the micromachine.

When the array of joints contemplated by this invention is to be formed of a shape-memorizing alloy, for example, the shape-memorizing alloy is preferably of a bi-directional type having one shape memorized in a low temperature zone and the other in a high temperature zone. A NiTi alloy or a CuZnAl alloy, for example, can be used as the shape-memorizing alloy in accordance with the description given above. Ideally for this invention, the NiTi alloy has a Ni content in the range of from 40 to 51% by weight and the CuZnAl alloy has a Zn content in the range of from 39 to 42% by weight and an Al content in the range of from 1 to 7% by weight.

As a heater for causing a change in shape of the shape-memorizing alloy, generally, a means for passing an electric current through the shape-memorizing alloy thereby effecting the desired heating thereof is adopted. In this case, however, it is difficult to obtain this heating means in a small size in a form having many joints. Thus, extremely small micro-heaters produced by the microfine semiconductor machining technique are attached singularly to each joint. The micro-heaters use a matrix of silicon and have a specific impurity substance such as phosphorus (P) or boron (B) distrubuted as conductors on the matrix. Ideally, these heaters measure 0.2 to 1.0 mm in width, 0.2 to 1.0 mm in length, and 0.1 to 0.5 mm in thickness.

In the array of joints having the shape-memorizing alloy and the heaters integrally combined as described above, the number of component joints is suitably fixed depending on such factors as the distance of travel. In a system combining a plurality of joint arrays, the number of legs protruding from the system proper can be set arbitarily depending on the range of a motion to be produced by the system, the direction of such a motion, etc. The legs of the system which is formed by the combination of joint arrays can be accurately expanded and contracted as an actuator by varying the temperatures of the joints depending on the directions and amounts of motions the heaters integrally attached to the joints are required to produce. Thus, the actuator can be controlled.

Further, in this invention, the actuator may be required to rotate about its axis. This rotation of the actuator is easily attained by forming the axial part thereof with a shape-memorizing alloy and a supporting member capable of producing rotation and making effective use of the twisting effect of the shape-memorizing alloy, namely the effect which is produced by causing the shape-memorizing alloy to memorize its shape to be assumed after a certain twist made in one direction, allowing it to resume its original shape, and enabling the axial part to be rotated by application of a voltage to the opposite ends of the shape-memorizing alloy.

Now, this invention will be described more specifically below with reference to a working example. It should be noted that the following example is cited for illustration of this invention and that the present invention is not limited to this particular example.

Fabrication of joint array

Figure 1B:
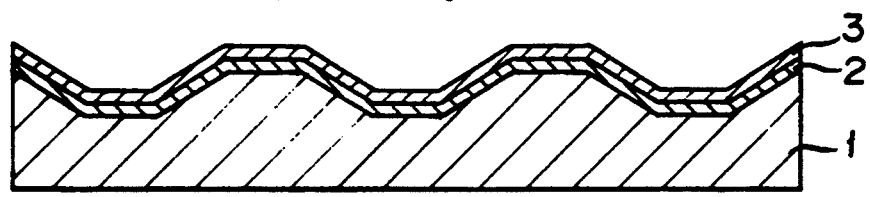

First, for the purpose of forming a shape-memorizing alloy in the shape of a bellows, a substrate 1 is formed in the shape of a sawtooth as illustrated in FIG. 1A by photolithography which is used for the production of semiconductor devices. The substrate 1 which is used in this case is intended solely for supporting thereon a shape-memorizing alloying member to be formed thereon. This invention does not discriminate the substrate 1 on account of the material used therefor. By reason of the ease of machining, a silicon substrate may be used, for example. On the sawtooth-shaped substrate 1, an oxide film 2 of a thickness in the range of from 0.1 to 5 $\mu$m, about 1 $\mu$m, for example, is formed as by the CVD method as illustrated in FIG. 1B so as not to deform the sawtooth-shaped substrate 1. Then, on the sawtooth-shaped oxide film 2, a thin film 3 of an alloy of Ti and Ni is formed by the sputtering method. The mixing ratio of the component metals in this alloy, Ti: Ni, is 49:51. This thin film 3 of alloy can be easily formed by sputtering a target alloy composed of Ti and Ni at the same mixing ratio. The thickness of the thin film 3 of alloy to be formed in this case is in the range of from 0.5 to 10 $\mu$m, preferably 1 to 5 $\mu$m.

Then, for the purpose of causing this thin film 3 of alloy to memorize a shape, the alloy of thin film 3 is kept heated in conjunction with the substrate 1 at a temperature roughly in the range of from 400° to 500° C. for a long period of time. As a result of this heat treatment, the shape of the sawtooth imparted to the substrate is memorized in a first temperature range exceeding 98° C. by the thin film 3 of shape-memorizing alloy. The shape thus assumed by the thin film 3 of shape-memorizing alloy measures 0.1 to 2 mm, preferably 0.5 to 1 mm, in width and 0.5 to 10 mm, preferably 1 to 5 mm, in length. The number of component joints is desired to be about 9. As a consequence of this treatment, the thin film of shape-memorizing alloy is allowed to assume an expanded shape at temperatures below 98° C. and a contracted shape at temperatures above 98° C.

Figure 1C:
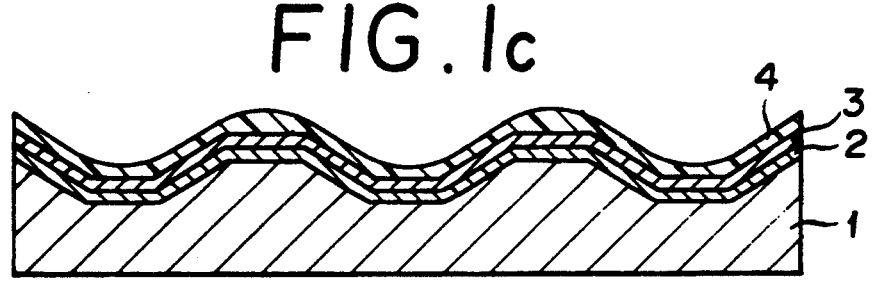
Figure 1D:
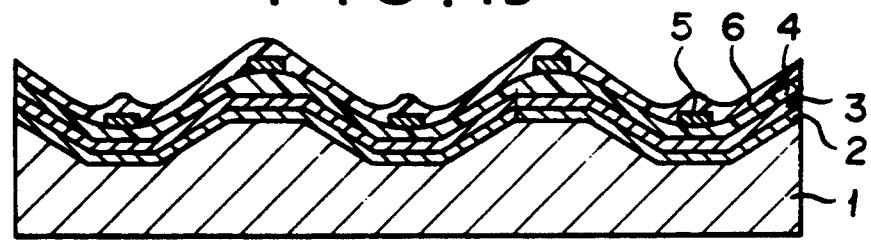
Figure 2:
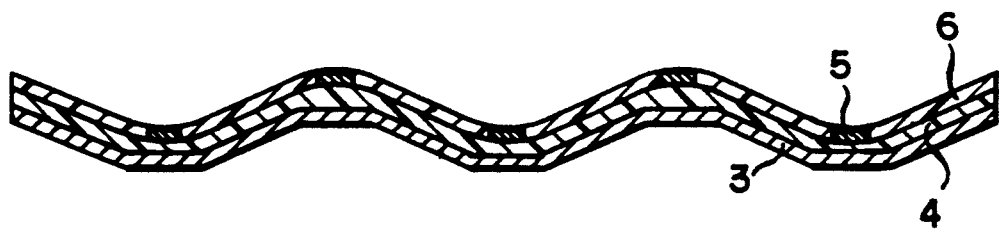
FIG. 2 is a cross section of the array of joints of this invention.

Then, on the thin film 3 of alloy, a polyimide film 4 is formed in a thickness in the range of from 0.5 to 5 $\mu$m, preferably from 1 to 3 $\mu$m, as illustrated in FIG. 1C by the spin coating method. On this polyimide film 4, a film of amorphous silicon (a-Si) destined to form a heating member is formed in a thickness in the range of from 0.1 to 5 $\mu$m, preferably from 0.5 to 3 $\mu$m, as illustrated in FIG. 1D by the plasma CVD method or sputtering method. After patterning a photoresist in the shape of the heater member, a-Si is etched out in the shape of islands destined to serve as heaters 5 by the RIE (reactive ion etching) method. Subsequently, conducting wires are formed thereon of such a material as gold or silver which excels in flexibility. On the conductors is superposed an insulating film 6 such as of polyimide in a thickness of from 0.5 to 10 $\mu$m, preferably from 1 to 3 $\mu$m, by the spin coating method.

Finally, the layers consequently produced as superposed on the substrate 1 are wholly immersed in hydrofluoric acid or hydrazine to dissolve out the substrate 1 and the oxide film 2 and obtain the shape-memorizing alloy provided with micro-heaters in an isolated form. At this time, the shape-memorizing alloy, in consequence of the separation thereof from the substrate 1, assumes a state elongated from the state in which it overlayed the substrate 1.

Figure 3A:
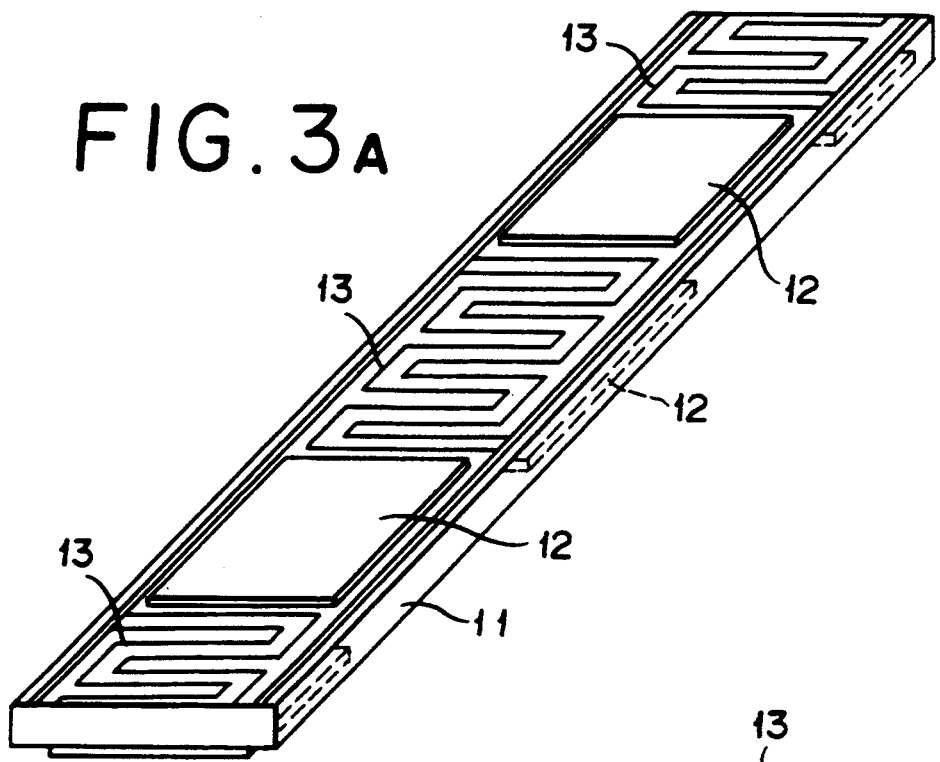
FIG. 3 is a perspective view illustrating an array of joints as another embodiment of this invention.
Figure 3B:
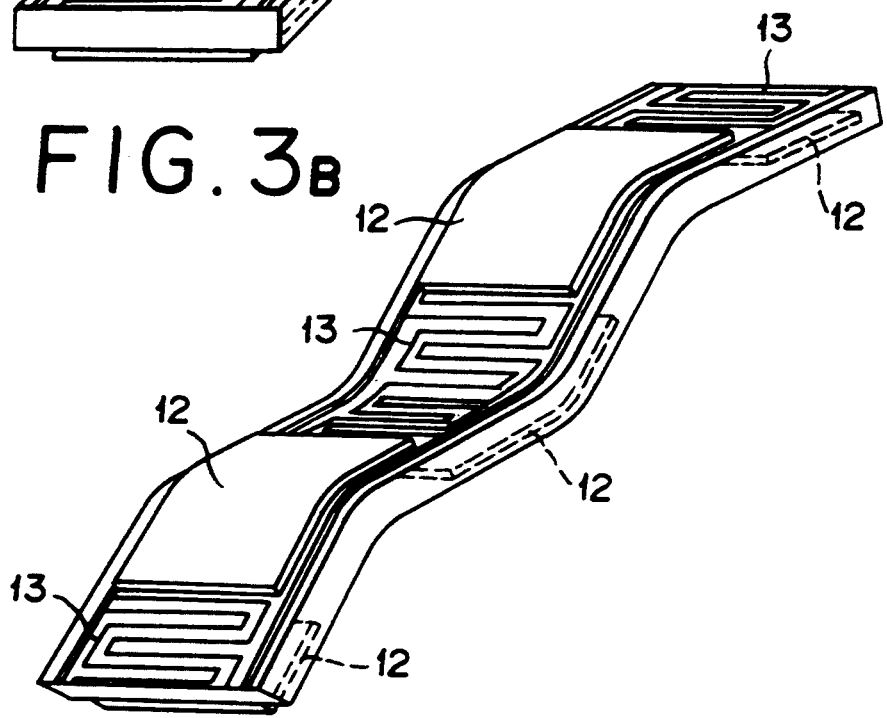

FIG. 3A and FIG. 3B illustrate a joint array as another embodiment of this invention. Shape-memorizing alloy layers 12 are superposed in a staggered pattern on the opposite surfaces of an elastic strip of silicon sheet 11 and diffusing heaters 13 are superposed on the opposite surfaces of the shape-memorizing alloy layers 12 which are devoid of a shape-memorizing film. The joint array is constructed in a prescribed shape in advance as illustrated in FIG. 3B.

Figure 4:
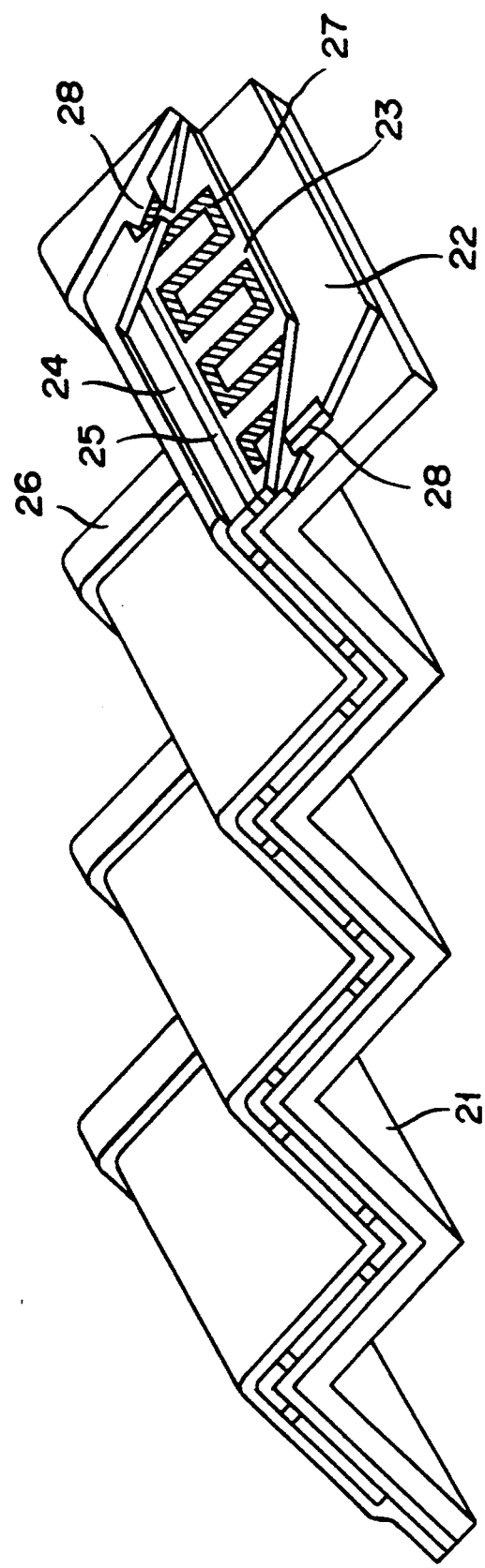
FIG. 4 is a perspective view illustrating an array of joints of yet another embodiment of this invention.

FIG. 4 illustrates another joint array as still another embodiment of this invention. To be specific, on the surface of a zigzag expandable member 21 formed of an elastic metallic material of tungsten, molybdenum, titanium, or titanium-nickel alloy, an insulating film 22 such as of polyimide, silicon oxide, or silicon nitride is formed, and diffusing heater layers 23 are formed singularly on each of the slanted parts on the surface of the insulating film 22. Shape-memorizing alloy film 24 are formed singularly near each of the bent parts of the ridges of the insulating film 22, and near the bent parts of the various parts and insulating layers 25 such as of silicon oxide or polyimide are disposed singularly on each of the boundaries between the shape-memorizing alloy films 24 and the diffusing layers 23. Metallic conductors 26 are laid on the surface of the insulating layers 25. The metallic conductors 26 and metallic conductors for the diffusing heaters 23 are interconnected via contact holes 28.

The diffusing heater layers 23 are formed, for example, by impurity defused semiconductors (having an impurity substance diffused in polysilicon). Or high-resistive alloy conductors such as of Ni-Cr are also available.

Figure 5:
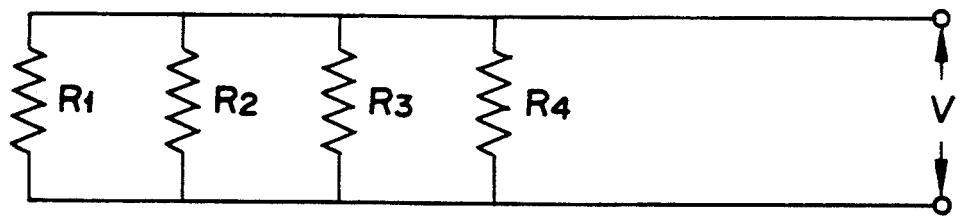
FIG. 5 is a wiring diagram for the array of joints of this invention.

The diffusing heaters which are formed on the joint array in this case are preferably so formed that the resistance gradually increases or decreases from one to the other terminal part. The expanding motion of the joint array with the diffusing heaters is electrically effected through the medium of a circuit which is illustrated in FIG. 5. The amount of heat generated is controlled by the applied voltage as represented by the following formula. The points of expansion are controlled by the change in the amount of heat so generated.

$$W = V/R \qquad (1)$$

wherein W stands for the amount of heat generated, V for the magnitude of applied voltage, and R for the magnitude of resistance.

When the magnitudes of resistance R are sequentially changed as represented by the expression of $R_1 < R_2 < R_3 < R_4$, the temperature of the resistor possessing the resistance of $R_1$ rises first and, by the gradual increase of the applied voltage V, the temperatures of the parts of the diffusing heaters possessing the varying amounts of resistance are able to be elevated to the prescribed levels. Thus, owing solely to the use of two conductors, the amount of expansion can be controlled by merely varying the applied voltage V.

This variation of the amounts of resistance can be effected by varying the length l, thickness t, width w, etc. of a relevant resistor. This is because the resistance R is directly proportional to the length and the resistivity ρ inherent in the substance and inversely proportional to the thickness and the width as indicated by the following formula 2.

$$R = l/tW \qquad (2)$$

Figure 6:
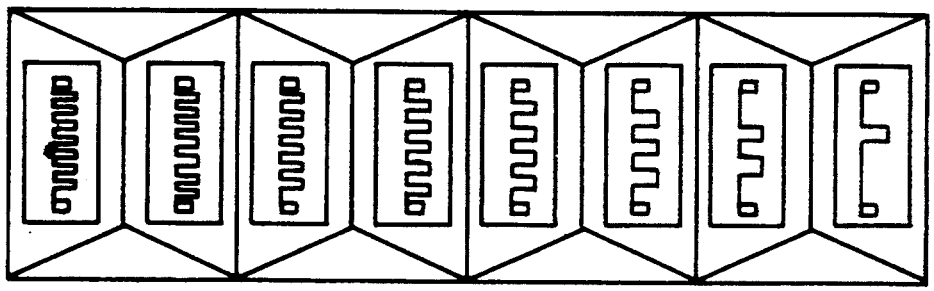
FIG. 6 is a diagram schematically illustrating a wiring distribution in the array of joints of this invention.

As shown in FIG. 6, therefore, the amount of resistance of a given part can be varied by varying the length l while keeping the thickness t, resistivity ρ, and the width w at respectively fixed levels.

Figure 7:
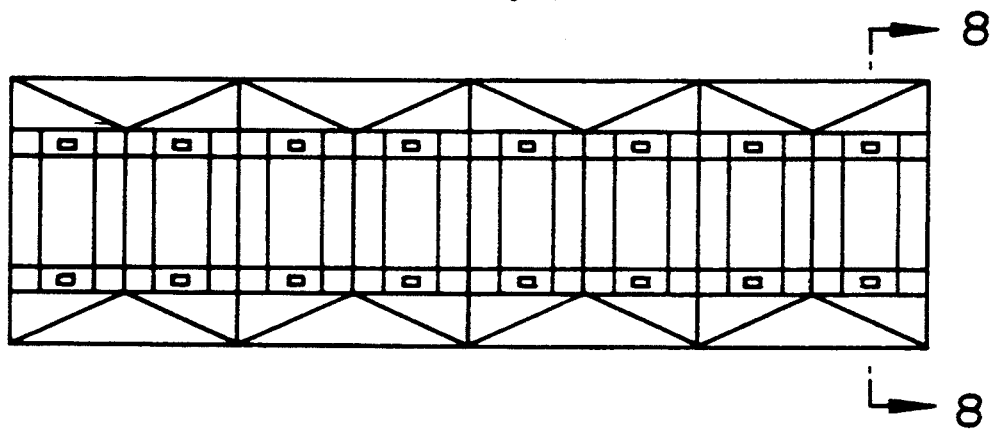
FIG. 7 is a diagram showing the relation between distributed wires and metallic wires used in the array of joints of this invention.
Figure 8:
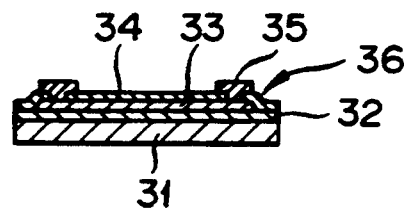
FIG. 8 is a cross section taken through FIG. 7 along the line 8—8.

The wire distribution for the resistors is attained by forming a silicon oxide layer 32 on an expandable substrate 31 (such as a silicon), laying conductors 33 such as of a Ni-Cr alloy or polysilicon on the surface of the silicon of the silicon oxide layer 32, superposing an insulating layer 34 on the surface of the conductors 33, and connecting the conductors 33 to metallic conductors 35 via contact holes 36 as illustrated in FIG. 7 and FIG. 8.

Fabrication of Actuator

Figure 9A:
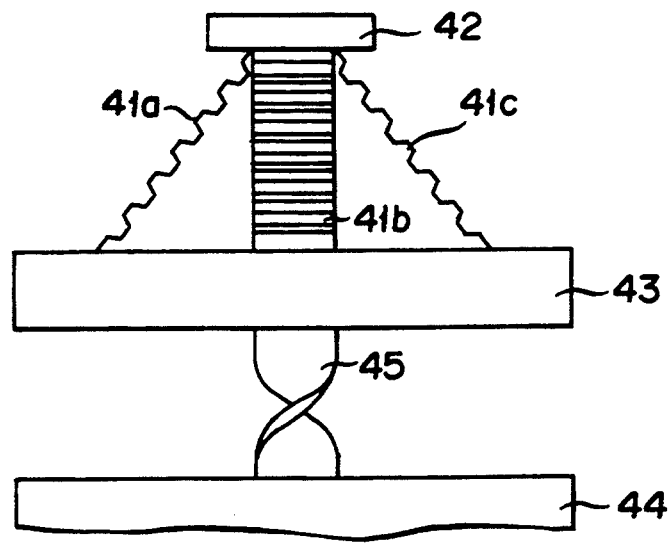
FIG. 9 is a top view and cross section illustrating one embodiment of this invention.
Figure 9B:
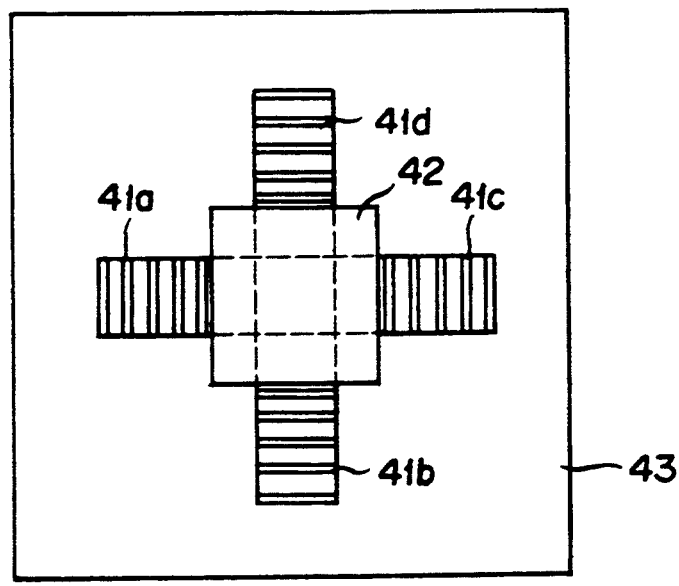

Joint arrays 41a, 41b, 41c, and 41d formed of shape-memorizing alloy which are provided with the aforementioned micro-heaters are arranged in the form of four legs on a substrate 43 (actuator base) like a wafer are illustrated in FIG. 9A and FIG. 9B. To the central part from which the legs protrude, a base 42 as for sensors forming a polyimide film or an insulating layer and an electroconductive film intended as a conductor is attached.

Fabrication of Axial Part

First, a shape-memorizing plate 45 of a Ti-Ni type alloy having a thickness in the range of from 0.1 to 5 mm, 0.5 mm for example, is twisted by an angle in the range of from 15 to 360 degrees, 180 degrees for example, and heated in the twisted state at a temperature approximately in the range of from 400° to 500° C. and consequently caused to memorize the twisted shape.

Then, this shape-memorizing alloy plate 45 is cooled to room temperature in its original shape. A conductor is laid so as to apply voltage to the opposite ends of the plate. One end of the conductor is fixed on a supporting member 44 and the other end thereof attached to the aforementioned base 43 for the actuator.

Operation of Actuator

The component joints of the joint array are contracted by heating the micro-heaters attached to the joints to a temperature in the first temperature range exceeding about 100° C. and are then expanded by causing the same micro-heaters to reach a temperature in the second temperature range (room temperature). By suitably selecting from the joint array such joints to be contracted or expanded, depending on the direction in which the actuator is to be driven, the sensor, for example, which is attached to the leading end of the actuator can be made to change its direction as desired. Further, the actuator part can be rotated by heating the shape-memorizing alloy forming the axial part thereof by application of a stated voltage to the opposite terminals of the shape-memorizing alloy of the axial part.

Figure 10:
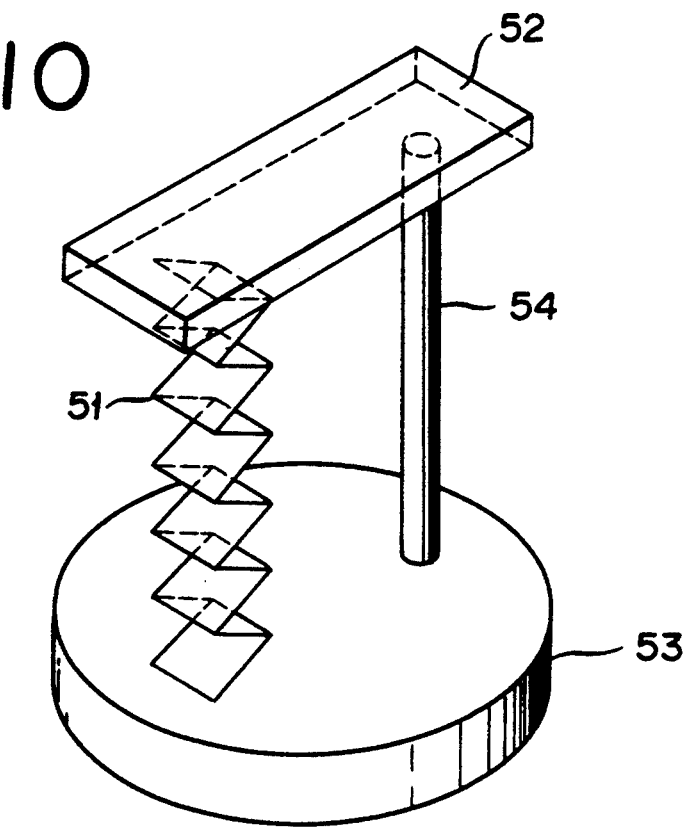
FIG. 10 is a perspective view illustrating another embodiment of this invention.
Figure 11:
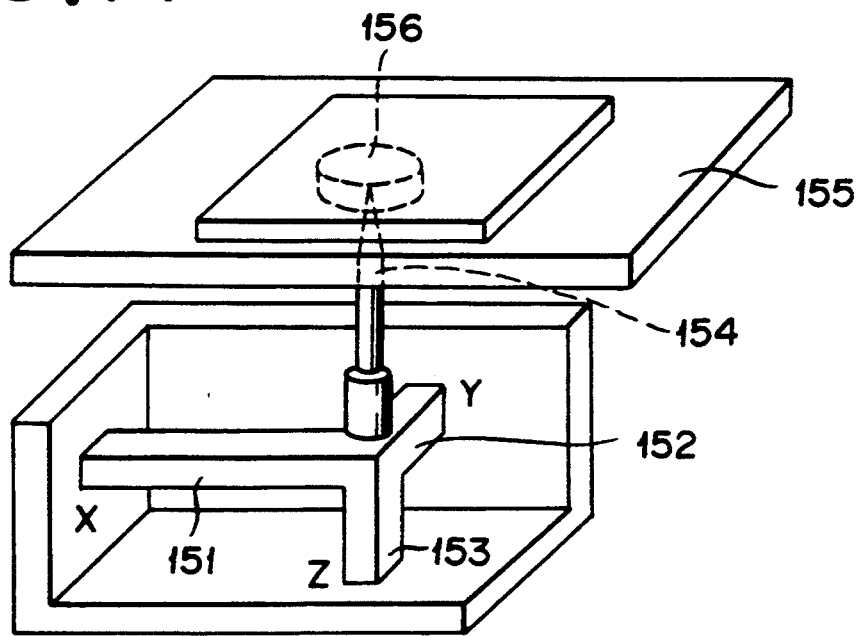
FIG. 11 is a perspective view illustrating a conventional probing head of STM.

In the embodiment described thus far, by virtue of the four legs of the joint arrays, the base 42 to which the sensor is attached can be moved to any direction within a hemisphere. It is permissible to embody this invention by disposing at least one joint array 51 as illustrated in FIG. 10 and adapting it to operate as an actuator with the aid of a sensor base 52, an actuator base 53, and a supporting member 54.

What is claimed is:

1. A contraction-extension mechanism type actuator providing its own drive source and comprising a joint array having a plurality of joints comprised of a shape-memorizing alloy, said joint array further having a shape-controlling heater thermally coupled to each of the joints of said joint array.

2. A contraction-extension mechanism type actuator of claim 1 wherein the plurality of joints are positioned in series.

3. An actuator according to claim 1, wherein said shape-controlling heaters are resistance heaters adapted so that the amounts of resistance of the heaters vary sequentially from a heater of a first joint to a heater of a last joint of said joint array.

4. An actuator according to claim 3, wherein the resistance of the heaters is varied by varying lengths of the resistance heaters.

5. An actuator according to claim 1, wherein the joint array is comprised of shape-memorizing alloy layers deposited on an expandable substrate.

6. An actuator according to claim 5, wherein said shape-memorizing alloy layers are disposed near joints on said substrate.

* * * * *